United States Patent
Baudry et al.

(10) Patent No.: US 7,085,398 B2
(45) Date of Patent: Aug. 1, 2006

(54) METHOD AND SYSTEM TO DECODE IMAGE WATERMARKS

(75) Inventors: Séverine Baudry, Beauchamp (FR); Philippe N'guyen, Boulogne Billancourt (FR)

(73) Assignee: Thales, Paris (FR)

( * ) Notice: Subject to any disclaimer, the term of this patent is extended or adjusted under 35 U.S.C. 154(b) by 594 days.

(21) Appl. No.: 10/338,038

(22) Filed: Jan. 8, 2003

(65) Prior Publication Data

US 2004/0001626 A1   Jan. 1, 2004

(30) Foreign Application Priority Data

Jan. 11, 2002 (FR) .................................. 02 00615

(51) Int. Cl.
*G06K 9/00* (2006.01)

(52) U.S. Cl. .................... 382/100; 380/54; 713/176

(58) Field of Classification Search .............. 382/100, 382/232, 240; 380/51, 54, 201, 210, 252, 380/287; 370/522–529; 283/72, 74–81, 283/85, 93, 113, 901, 902; 704/200.1, 273; 705/57, 58; 713/176, 179; 725/9, 20, 22; 358/3.28

See application file for complete search history.

(56) References Cited

U.S. PATENT DOCUMENTS 6,546,114 B1 * 4/2003 Venkatesan et al. ........ 382/100
6,567,533 B1 * 5/2003 Rhoads ...................... 382/100
6,845,170 B1 * 1/2005 Wendt ....................... 382/100
2001/0016051 A1   8/2001 Rhoads
2001/0017931 A1   8/2001 Rhoads et al.

FOREIGN PATENT DOCUMENTS

| EP | 098113 | 2/2000 |
|---|---|---|
| EP | 156660 | 11/2001 |
| FR | 2 792797 | 10/2000 |
| WO | WO 0124113 | 4/2001 |
| WO | WO 0159689 | 8/2001 |

OTHER PUBLICATIONS

Joseph J.J.K.O. Ruanaidh, et al. "Rotation, Scale and Translation Invariant Spread Spectrum Digital Image Watermaking", Signal Processing, vol. 66, No. 3, May 28, 1998, pp. 303-317.

(Continued)

*Primary Examiner*—Jingge Wu
*Assistant Examiner*—Abolfazl Tabatabai
(74) *Attorney, Agent, or Firm*—Lowe Hauptman & Berner, LLP (57) ABSTRACT

In a device and a method for the determining local geometrical variations that have occurred in data, the data comprise a reference pattern X. The method comprises, for example, the following steps:
  modeling the local geometrical variations by means of an index variable J, said variable making it possible to place the samples of the distorted data in correspondence with those of the original data,
  estimating the local variations by using the reference pattern X included, a model of local distortion of the data and the distorted data.

13 Claims, 3 Drawing Sheets

OTHER PUBLICATIONS

Bas P. et al., "Robust Watermarking Based on the Warping of Pre-Defined Triangular Patterns", Proceedings of the SPIE, vol. 3971, Jan. 24, 2000, pp. 99-109.

Shelby Pereira, et al., "An Iterative Template Matching Algorithm Using the Chirp-Z Transform for Digital Image Watermaking", Pattern Recognition, Pergamon Press Inc., vol. 33, No. 1, Jan. 2000, pp. 173-175.

P. Bas, et al., "Robust Watermarking Based on the Warping of Pre-Defined Triangular Patterns", Proceedings of the SPIE, Bellingham, VA, vol. 3971, Jan. 2000, pp. 99-109.

* cited by examiner

METHOD AND SYSTEM TO DECODE IMAGE WATERMARKS

BACKGROUND OF THE INVENTION

1. Field of the Invention

The invention relates to a method and system that can be used especially to estimate the unknown geometrical transformations that have occurred in data, for example in an image, or in an audio or video sequence.

It can be applied to correcting the distortions that have occurred in the transmission of images and/or to obtaining information on message-carrying watermarks.

The invention is used for example in watermarking. Indeed, a geometrical transformation in an image most usually makes the watermark illegible. In watermarking a reference pattern in the image it is thus possible to make an estimation, in a watermark reader for example, of the geometrical transformation that has occurred, and then to reverse it before decoding the message-carrying watermark.

2. Description of the Prior Art

Resistance to geometrical transformation is a crucial problem in watermarking. The detection of the watermark is often made impossible when the received message is distorted with respect to the original message.

Modifications of the geometry of the image indeed often occur during the distribution or exploitation of a work. This is the case especially with shearing or scaling which may be related with changes in format.

Analog/digital and digital/analog transformations may introduce a distortion in the image or they may introduce line "jitter" in a video sequence.

There are also highly effective, ill-intentioned attacks, such as the Stirmark attack described in 1988 by F. Petitcolas et al in "Attacks on copyright marking systems", Proceedings of $2^{nd}$ Information Hiding Workshop. This attack was designed to prevent the accurate detection of watermarks.

Different methods designed to counter the harmful effect of geometrical modifications have therefore been developed. They can be classified under five categories:

1) The Watermarking of a Reference Pattern Known at Transmission and at Reception A simple method that uses a reference pattern is described in the patent FR 2.792.797. In this invention, a reference pattern known as a co-watermark is added to the image. At reception, the search for maximum self-correlation between the received image and the reference pattern makes it possible to determine the original coordinates of the initial image. This method is resistant to shifting, shearing and translation undergone by the image, i.e. to the global distortions of the image. The method becomes inefficient when the geometrical transformation is more complicated, for example when the transformation is a rotation, a scaling or zooming, a carpet distortion, etc.

S. Pereira and T. Pun in "Fast Robust template Matching for Affine Resistant Image Watermarking", Proceedings of International Workshop on Information, have proposed a more general co-watermarking method to resist affine transformations of the image. However, this method is limited and can be used to readjust the image only for affine geometrical transformations.

Another method proposed by S. Voloshynovskiy, F. Deguillaume, T. Pun in "Multibit Digital Watermarking Robust Against Non-linear Geometrical Transformations", Proceedings of ICIP 01, is used to resist more complex global and/or local transformation. A reference pattern is watermarked orthogonally to the message which, for its part, consists of a symmetrical and periodic pattern. The decoding of the watermark and the estimation of the transformation are done in conjunction.

Two watermarks are inserted: the message-carrying watermark w1 and a reference watermark w2 (co-watermark). The message-carrying watermark consists of a block sized Kx, Ky symmetrized and periodized so as to obtain a block having the size of the image. The estimation is made in the Fourier domain: the fact that w1 is periodic implies the presence of the evenly spaced out peaks in the Fourier domain. For each block of the image, it is considered that the local distortion may be approximated by an affine geometrical transformation (a combination of rotation, non-uniform scaling and translation). During decoding, for each block, a search is made for the affine transformation that minimizes the distance between the reference watermark and the distorted image, provided that this transformation is plausible (for example cases of excessive stretching are eliminated). This method is efficient for readjusting the watermarks but is complex because it calls for an exhaustive search for parameters for each block of the image. Furthermore, it is based on an approximation (a non-linear local transformation cannot be reduced to a succession of affine transformations) and does not take account of the correlations existing between estimated parameters for neighboring blocks.

2) Watermarking in an Invariant Space by Geometrical Transformation

O'Ruanaidh and T. Pun in "Rotation, scale and translation invariant spread spectrum digital image watermarking", Signal Processing, Vol. 66 No. 3, p 303–317, propose that the watermarking should be performed in an invariant space by rotation, translation, scaling, to overcome the effects of any geometrical transformation that may be performed on the image. This result is obtained by taking advantage of the properties of the Fourier-Mellin transform. The advantage of this method is that it enables resistance to geometrical transformations without the need for any preliminary synchronization. Its drawback is that the invariant properties are no longer respected when the circular translation is replaced by a shearing of the image. Furthermore, this method is complex and costly in terms of computation and may raise problems of digital computation. Again, the density of the information embedded in the image varies greatly 3) Watermarking in a Referential System Related to the Image In another approach, a reference system linked to the image is chosen in order to embed the watermark and detect it. When the geometry of the image is distorted, the referential system will be modified in the same way, and it will then be possible to recover the mark without any need for an external synchronization.

The method described by P. Bas, J. M Chassery and B. Macq, "Robust Watermarking based on the warping of predefined triangular patterns" Proceedings of SPIE—January 2000, uses a local system of reference coordinates linked to a set of regions characteristic of the image. These regions may be defined in particular by points of interest, such as those obtained by a Harris detector described in C. Harris and M. Stephen, "A combined corner and edge detector", 4 Alvey Vision Conf, p.147–151,1988.

4) The Redundant Insertion of Watermarking in the Image.

5) The Exhaustive Search for All the Possible Transformations.

The idea of the invention consists especially in estimating local distortions or distortions considered to be local, introduced into the data, such as images, audio, video etc., where the estimation may be done globally or locally.

SUMMARY OF THE INVENTION

The invention therefore relates to a method for the determining, in a watermark reader, of local geometrical variations that have occurred in data, the data comprising a reference pattern X, wherein the method comprises at least the following steps:

modeling the local geometrical variations by means of a variable of indices J, said variable making it possible to place the samples of the distorted data in correspondence with those of the original data, estimating the local variations by using the reference pattern X included, a model of local distortion of the data and the distorted data.

The device is, for example, a watermark decoding receiver.

The method makes a global or local estimation, for example of the local geometrical variations.

The local distortion model may be, for example, a Markov model.

The data may be of the audio, video or image type.

According to one alternative embodiment, the method comprises a step in which the estimated data on local distortions are used to deduce a piece of information on the watermark and/or to correct the data.

The invention also relates to a device for estimating the local geometrical variations that have occurred in data, said data comprising a reference pattern X. The device comprises at least one microprocessor adapted to estimating the local geometrical variations that have occurred in the data by using the reference pattern included, a model of local distortion of the data and the distorted data, the local geometrical variations of the distorted data being modeled by means of an index variable J making it possible to place the samples of the distorted data in correspondence with those of the original data.

The local geometrical variations of the data have occurred for example during their transfer or again during their storage.

The microprocessor is adapted, for example, to determining the local geometrical variations for data of the audio, video or image type.

It may also be adapted to correcting the distortions induced in images received by a watermark reader and/or to producing a piece of information on the watermark.

The invention has the following advantages in particular:
the rate of accurate decoding of the watermarking is greatly improved,
it provides for optimum estimation of the geometrical transformations that have occurred on the support data during their transmission, their storage, etc. from the known synchronization pattern.
It makes for low complexity of estimation, as compared with the complexity of an exhaustive search algorithm.

BRIEF DESCRIPTION OF THE DRAWINGS

Other features and advantages of the invention shall appear more clearly from the following description, given by way of an illustration that in no way restricts the scope of the drawings. Of these drawings.

MORE DETAILED DESCRIPTION

In order to provide for a clearer understanding of the method according to the invention, the following description is given for a particular type of data carrier, that of still images, it being known that the method can be applied generally to every type of data carrier:

a 1 D carrier, for example of audio data,
a 2D carrier, for example of a still image,
a 3D carrier, for example of 3D volumes or image sequences, etc.

Figure 1:
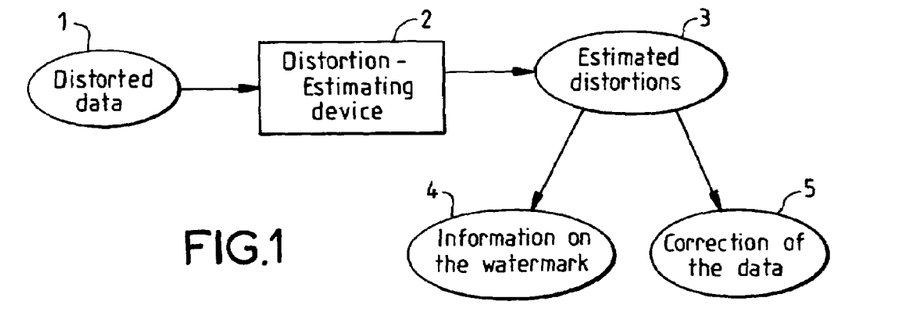
FIG. 1 is a block diagram of an exemplary watermark reader according to the invention, FIG. 2 exemplifies values taken by the index variable during a transformation of jitter.

FIG. 1 is a block diagram of a watermark reader according to the invention. The distorted data 1 are received in a watermark reader or receiver known to those skilled in the art. This receiver has a processor 2 adapted to estimating the distortions introduced into the data. For example, it is programmed to implement the steps of the different variants of the method described here below. The estimated distortions 3 are then used for example either to deduce a piece of information 4 on the message-carrying watermark itself, or to correct 5 the distortions.

Figure 2:
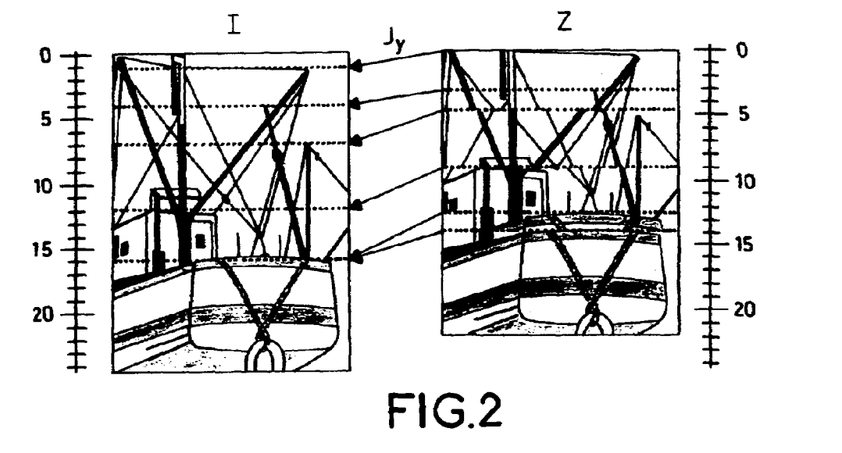

FIG. 2 shows an example of values taken by the index variable (defined here below) characterizing a distortion during a transformation of jitter on an image. The left-hand image I corresponds to the original image and the right-hand image Z corresponds to the distorted image. The arrows Jy express the correspondence between the different lines of the images.

A few definitions and notations using the description are also given:

The expression "carrier data" refers to the data into which the watermark is inserted: this data may be of the audio, video or other type.

The term "signal sample" may then designate a pixel, a line, a column of an image, an audio signal sample (as in the case of audio data), an entire image (as in the case of a video image, when the transformation eliminates or duplicates the images of the video sequence).

The word "co-watermark" designates the reference pattern known by the watermark reader and used by it to estimate unknown characteristics of the transformations made on the image (geometrical distortions for example).

The scalar variables are shown in standard characters and the vector variables in bold characters. They are:

I: original image (carrier data). I(x,y) represents the value of the pixel on the x-axis and on the y-axis.
(n,k): size of I (n is the height of the image and k is its width)
X: co-watermark pattern
$I_w$: watermarked image.
Z: possibly watermarked and possibly altered image received by the watermark reader/detector.
(n',k'): size of Z (n' is the height of the image and k' is its width).
$Z_y$ denotes the line No. y of the image Z.
J: index variable modeling the geometrical distortion undergone by the image. This variable makes it possible to place the samples of distorted data received by a receiver in a state of correspondence with the original data. It takes, for example, the form of a vector field, The probability of a variable Y is written as P(Y)

The joint probability of a set of variables $Y_1 \ldots Y_q$ is written as $P(Y_i; \ldots ; Y_q)$ The probability of a variable $Y_1$ conditional on a variable $Y_2$ is written as $P(Y_1/Y_2)$. Bayes' formula gives the relationship between conditional probability and joint probability:

$$P\left(\frac{Y_1}{Y_2}\right) = \frac{P(Y_1; Y_2)}{P(Y_2)}$$

$Y_{a,b}$ designates the vector formed by the components (a,a+1, . . . ,b) of the vector Y $$\underset{x}{\operatorname{Argmax}}[f(x)]$$

designates the value of x for which the value of f(x) is the maximum.

Furthermore, in the context of the description, the Markov model is generalized as follows: the data of the index variable J (matrix with the size of the image) characterizes every geometrical transformation in a unique way. However, if a geometrical transformation is to be realistic, that is to say if it is not to distort the image excessively, J takes certain values only. In particular the components of J must be correlated for example. In other words, the values J(x+dx, y+dy) for variations where dx and dy are sufficiently "small" will depend directly on J(x,y), the value taken by the index variable at x,y. For example, J(x+dx, y+dy) will generally be close to J(x, y) for most of the realistic models of transformations. There is a large number of models to express the local correlation between components of J. The simplest model, for 2D data, is that of the Markov fields. In this model, the value J(x,y) depends solely on the values of J in a local neighborhood, namely the values of J(x+dx, y+dy) for small values of dx, dy. For one dimension data, the corresponding model is that of the Markov chains, where J(x+dx) depends solely on the value taken by J(x). It is this model that is used in the method, given by way of an illustration that in no way restricts the scope of the invention, to describe an exemplary embodiment of the method according to the invention.

The Markov model especially has the advantage of being powerful and of being applicable to a large number of distortions. It may be noted that a distinction is made between the homogeneous Markov chains/fields (where the conditional laws of probability are independent of the position of the pixel contained), and the inhomogeneous Markov chains/fields (where the conditional laws vary spatially). However, it may prove to be useful to consider cases where the inter-pixel correlations are extended and more complex. In the description, the expression "correlation model" is used to designate any model of geometrical distortion in which the components of the index variable are locally or globally correlated.

Figure 3:
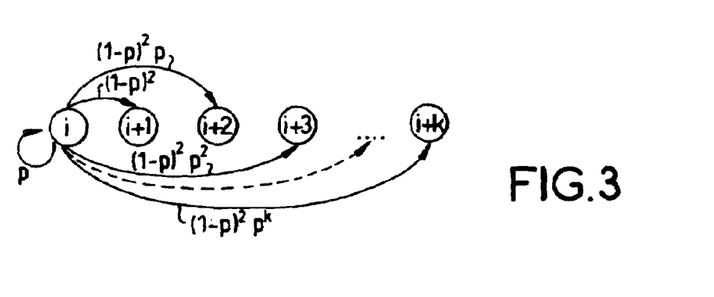
FIG. 3 shows the index when the jitter is a Markov chain.

FIG. 3 represents the graph of states associated with the probabilities of inter-state transition for a Markov model in the particular case where the geometrical transformation is a jitter and where the probability of elimination of a line or column ($p_{sup}$) and the probability of insertion of a line or column ($p_{ins}$) are equal to ($p_{ins}=p_{sup}=p$).

Description of the Synchronization Pattern or Co-Watermarking

The synchronization pattern in the case of the still image is for example a matrix X with the size of the image I.

In a particular embodiment of the invention, the matrix is obtained by simulation of a zero-mean Gaussian law with variance $\sigma^2$, each element of the matrix being independent of the other elements. The numerical value of $\sigma^2$ determines the robustness as well as the visibility of the method. The synchronization pattern X is then watermarked in the image I to obtain the marked image $I_w$.

In a particular embodiment of the invention, the pattern is added to the image as follows: $I_w(x,y)=I(x,y)+X(x,y)$ for all the coordinates (x,y) of the pixels of the image.

In another embodiment of the invention, the pattern is added to the image adaptively in order to augment the robustness while at the same time reducing the visibility: $I_w(x,y)=I(x,y)+\gamma(x,y)*X(x,y)$; $\gamma(x,y)$ being a weighting coefficient of the force of the watermarking depending, for example on the local characteristics of the image (variance, texture etc.) in order to obtain improved invisibility.

Figure 4:
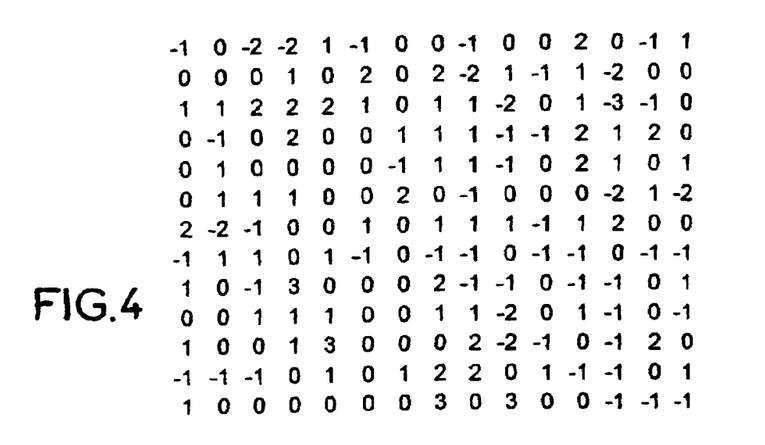
FIG. 4 shows an exemplary synchronization pattern.

The synchronization pattern X(x,y) is furthermore known to the apparatus detecting and/or decoding the watermarks. An exemplary co-watermark pattern (synchronization pattern) is given in FIG. 4. In this example, each value is rounded out to the nearest integer.

Insertion of the Carrier Watermark

Figure 5:
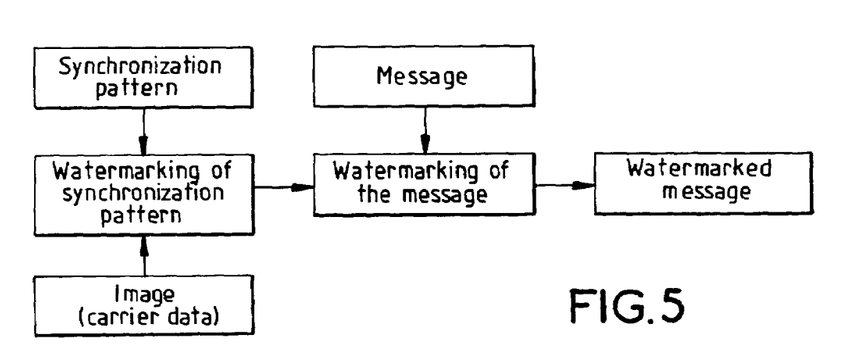
FIG. 5 is a drawing showing the insertion of the message-carrying watermark and the synchronization watermark.
Figure 6:
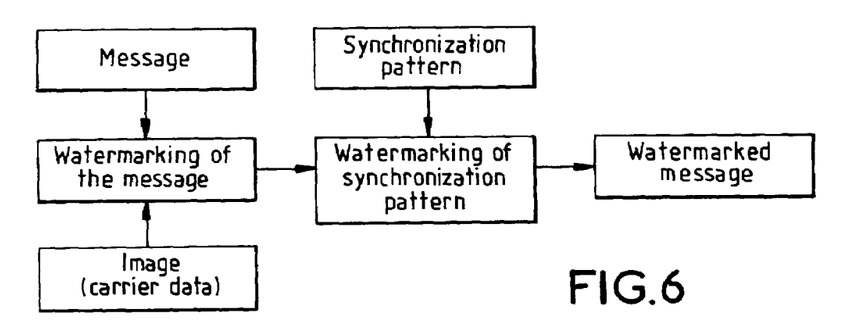
FIG. 6 is a drawing showing the insertion of the message-carrying watermark and the synchronization watermark.

The insertion of the message-carrying watermark is done either before the insertion of the synchronization pattern, for example after the steps given in FIG. 5, or after the steps given in FIG. 6.

In FIG. 5 the synchronization pattern 1 is watermarked before the message 2 to give the watermarked image 3.

In FIG. 6 the message-carrying watermark is watermarked 4 before the synchronization pattern 5 to give the watermarked image 8.

Any watermarking technique may be used to introduce the message.

The Watermarking Channel

As mentioned here above, during operation or transmission or again storage of the image (more generally storage of the data received by a watermarking reader), this reader may undergo modifications.

These modifications may be tonal in nature (the value of the pixels and modified) and/or geometrical (the geometry of the image is modified and the localization of the pixels differs between the original image and modified image). The modifications made in the image generally cause deterioration also in the embedded watermark. These modifications are generally random and unknown when the watermarking is written and the totality of these modifications is designated by the term "watermarking channel".

The distortions introduced into the image consist for example of a jitter of lines and columns as described in F. Petitcolas, R. J. Anderson et M. G. Kuhn "Attacks on copyright marking systems", Proceedings of $2^{nd}$ Information Hiding Workshop, 1998, combined with a tonal noise having a variance denoted by $\sigma_b^2$. This tonal noise, in the case of an additive watermark message may, for example, be prompted by the image itself which is considered to be a random vector.

The line jitter and column jitter respectively randomly duplicate certain lines and certain columns of the image respectively. The probability of elimination of a line is referenced $p_{sup}$ and the probability of a line is referenced $p_{ins}$.

Modeling of the Watermarking Channel with Geometrical Distortions

The geometrical distortions and transformations may be modeled in using a random variable called "an index variable". In the case of the still image, this variable is a 2D vector field having the size of the image and being written as $J(x,y)=[J^x(x,y),J^y(x,y)]$.

For each pixel in position (x,y) of the modified image Z, this variable indicates the position (x',y') of the corresponding pixel in the original image I where $x'=J^x(x,y)$ indicates the x-axis value in the original image and $y'=J^y(x,y)$ indicates the y-axis value.

This is equivalent to the following formula: $Z(x,y)=I(J^x(x,y),J^y(x,y))$.

Modeling of the Jitter Channel

In the case of the line jitter, $J^x(x,y)$ is deterministic and equal to x; $J^y(x,y)$ is random and depends only on y.

In the case of the column jitter, $J^y(x,y)$ is deterministic and equal to y; $J^x(x,y)$ is random and depends only on x.

In this precise case, only one of the components of the index variable is random and it is this latter component that is subsequently taken into account. The notations used are $J(x)$ or $J_x$ (the case of column jitter) or $J(y)$ or $J_y$ (the case of line jitter).

To provide for a clearer understanding of the method according to the invention, the different steps explained here below pertain to the particular case of the line jitter. The case of the column jitter is totally symmetrical, with the variable x being replaced by y and vice versa.

For the line jitter, we have: $Z_y=I(J_y)$ i.e. the line No. y of the received image Z corresponds to the line No. $J_y$ of the original image I.

It can be shown in the case of the jitter that J(y), is a Markov chain according to a method described in S. Baudry, P. Nguyen and H. Maître, "A soft decoding algorithm for watermarks subject to a jitter attack", Proceedings of SPIE, Image Security Technologies and Applications, Volume 4472, July 2001. The probabilities of transition of the Markov chains, in the case of the jitter (see FIG. 3), are given by:

$P(J_y=i/J_{y-1}=i)=p_{ins}$ (duplication of one line)
$P(J_y=i/J_{y-1}=i-1)=(1-p_{ins})(1-p_{sup})$ (normal case)
$P(J_y=i/J_{y-1}=i-2)=(1-p_{ins})(1-p_{sup})p_{sup}$ (elimination of one line)
$P(J_y=i/J_{y-1}=i-3)=(1-p_{ins})(1-p_{sup})p_{sup}^2$ (elimination of two lines)
. . . .
$P(J_y=i/J_{y-1}=i-j-1)=(1-p_{ins})(1-p_{sup})p_{sup}^j$ (elimination of j lines)
Etc.

The method of the invention can also be applied to other values of probabilities of transition. The index variable must preferably comply with this Markovian condition in order to lead to optimum results.

Modeling of the Combined Jitter+Additive Noise Channel

Figure 7:
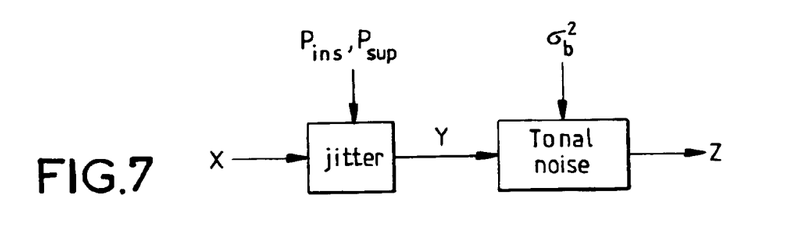
FIG. 7 is a model of a combined jitter and tonal noise channel.

The watermarking channel is modeled realistically by a combined channel formed by jitter followed by a tonal noise, according to FIG. 7.

Figure 8:
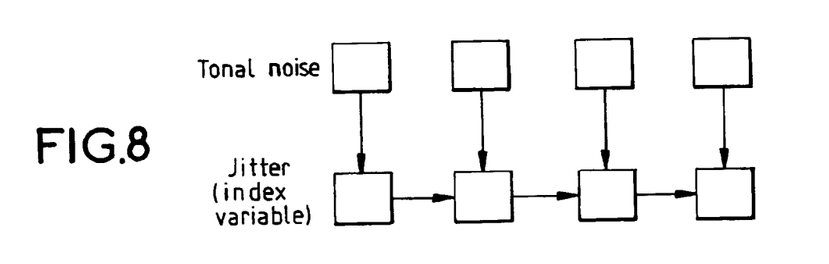
FIG. 8 shows the geometrical and tonal noise, FIG. 9 exemplifies the Viterbi algorithm.

In a special non-restrictive embodiment described here below, the type of tonal noise considered is a white Gaussian additive noise with a variance written as $\sigma_b^2$. Without departing from the framework of the invention, other types of tonal noise may be considered (substituted noise for example). The tonal noise is white, i.e. the values taken by the samples of the tonal noise are independent while the values of the index variable are correlated. This condition is expressed in FIG. 8 by the presence of links or arrows between the representations of the index variables (lower chain) and by the absence of these links between the values taken by the tonal noise.

If $U_i$ is the value of the original sample No. i and $V_i$ the value of the noise-ridden sample No. I, the white noise condition is expressed by:

$$P_{tonal}(V_i,V_j/U_i,U_j)=P_{tonal}(V_i/U_i)P(V_j/U_j)$$

$P(Z_y/I_y=m)$ will denote the probability linked to the tonal noise for the index y. More specifically:

$$P(Z_y/J_y=m)=P_{tonal}(Z_y/X_m)$$

In the particular case where the tonal noise is white and additive and follows a zero-mean Gaussian law with variance $\sigma_b^2$ we have:

$$P_{tonal}(x) = \frac{1}{\sqrt{2\pi}\,\sigma_b} e^{-\frac{x^2}{2\sigma_b^2}}$$

and the following is the probability of having, at output, the value $V_k$ in the position k, it being known that the value $U_k$ at input in position k:

$$P\left(\frac{V_i}{U_i}\right) = P_{tonal}(V_i - U_i) = \frac{1}{\sqrt{2\pi}\,\sigma_b} e^{-\frac{(V_i-U_i)^2}{2\sigma_b^2}}$$

Furthermore, in the case of jitter, it is necessary to compute the contribution of the tonal noise to the entire line with a length of k pixels. In the case of an identically distributed white noise, we have:

$$P_{tonal}(x) = \frac{1}{\sqrt{2\pi}\,\sigma_b} e^{-\frac{x^2}{2\sigma_b^2}}$$

and the following is the probability of having, at output, the value $V_k$ in position k, it being known that we have the value $U_k$ at input in position k, $$P\left(\frac{V_i}{U_i}\right) = P_{tonal}(V_i - U_i) = \frac{1}{\sqrt{2\pi}\,\sigma_b} e^{-\frac{(V_i-U_i)^2}{2\sigma_b^2}}$$

Furthermore, in the case of jitter, it is necessary to compute the contribution of the tonal noise to the entire line with a length of k pixels. In the case of an identically distributed white noise, we have:

$$P\left(\frac{Z_y}{J_y} = m\right) = \prod_{i=1}^{i=k} P_{tonal}(Z(i,y) - X(i,J_y)) = \frac{1}{(\sqrt{2\pi}\,\sigma_b)^k} e^{-\frac{\sum_{i=1}^{i=k}(Z(i,y)-X(i,J_y))^2}{2\sigma_b^2}}$$

Now that certain conventions and assumptions have been introduced, the rest of the description describes the different modes of implementation used by the method according to the invention.

Estimation Of The Geometrical Transformations

The watermark reader receives a watermarked image Z that has possibly undergone geometrical distortions unknown at reception. Starting from Z, the method consists in determining the distortions if any, for example in order to detect and/or decode the watermark present.

The decoding and/or the detection are improved when the geometrical transformation is partially or totally known. The aim of the invention especially is to provide a method to optimize the particular embodiment of the jitter that has occurred in the image, hence to estimate the value taken by J(y) for all the possible values of y (in the case of a line jitter). J shall denote the set of values J(y) for all the values of y.

To this end, for example, the invention implements for example a method that makes use of a Markov model, or more particularly, a Markov type model as explained here above. The idea is to make a global estimation of the index variable J (in taking account especially of the local correlations between components of J), or to estimate each component of J one by one. Two alternative embodiments are explained here above, by way of an illustration that in no way restricts the scope of the invention: the first method is called the "forward-backward method" and the second the "Viterbi method".

First Alternative Embodiment=Forward-Backward Method

In the variant of the method known as the <<forward-backward>> method, for each component Jy of the index variable J, a search is made for that value which a posteriori is the most probable value, given the observation of the received image Z, and the knowledge of the co-watermark pattern X, i.e.:

$$\hat{J}_y = \underset{m}{\mathrm{Argmax}}\left(P\!\left(J_y = \frac{m}{Z;X}\right)\right)$$

where $\hat{J}_y$ is the estimation sought for the line No. y of the distorted image.

By applying the Bayes formula, we obtain, in an equivalent way:

$$\hat{J}_y = \underset{m}{\mathrm{Argmax}}\left(P\!\left(J_y = \frac{m;Z}{X}\right)\right) \quad \text{(equation fw.1)}$$

To simplify the writing, the variable X is longer mentioned in the notations. All the probabilities mentioned must therefore be understood as being conditional on X.

Notations:

Take $\alpha_y(m)$ such that the quantity $\alpha_y(m) = P(Z_{1,y}; J_y = m)$ $\alpha_y(m)$ represents the probability of observing the y first lines of the image received ($Z_{1,y}$), and of having the line No. y of the received image corresponding to the line No. m of the original image, And $\beta_y(m)$ such that the quantity $\beta_y(m) = P(Z_{y+1,n'}/J_y = m)$. $\beta_y(m)$ corresponds to the probability of observing the n'-y last lines of the received image ($Z_{y+1,n'}$), on the assumption that the line No. y of the received image corresponds to the line No. m of the original image.

$P(J_y = m; Z/X)$ is expressed for example as a function of $\alpha_y(m)$ and $\beta_y(m)$, indeed $$P\!\left(J_y = \frac{m;Z}{X}\right) = P(J_y = m; Z_{1;y}; Z_{y+1;n'} / X) \quad \text{(equation fw.2)}$$
$$= P(Z_{y+1;n'} / J_y = m; Z_{1;y}; X) P(J_y = m; Z_{1;y} / X)$$
$$= P(Z_{y+1;n'} / J_y = m; X) P(J_y = m; Z_{1;y} / X)$$
$$= \alpha_y(m)\beta_y(m)$$

The first equation line is simply a development of the term sought. The second line is obtained by means of Bayes' formula. In the third line, the first term actually comes from the fact that, since the additive noise is white, the value observed for the received lines y+1 to n' of the image depends only on the index variable at y and on the value of the original watermark; and is independent of the values taken by the lines 1 to y.

In the case of a Markov model, $\alpha_y(m)$ and $\beta_y(m)$ can be computed recursively, making the computation less complex than a direct computation.

Step 1=Computation of $\alpha_y(m)$ $\alpha_y(m)$ is initialized as follows in y=1 (line No. 1 of the received image), for all the values of m between 1 and n (height of the original image):

$$\alpha_1(m) = P(Z_1/J_1 = m)P(J_1 = m)$$

then $\alpha_y(m)$ is computed recursively for all the values of y between 2 and n' (height of the image received) and for all the values of m between 1 and n.

$$\alpha_{y+1}(m) = P(Z_{1,y+1}; J_{y+1} = m)$$
$$= P(Z_{y+1}; Z_{1,y}; J_{y+1} = m)$$
$$= \sum_{j=0}^{j=m} P(Z_{y+1}; Z_{1,y}; J_y = j; J_{y+1} = m)$$
$$= \sum_{j=0}^{j=m} P(Z_{y+1} / Z_{1,y}; J_y = j; J_{y+1} = m) P(J_{y+1} = m / Z_{1,y}; J_y = j) P(Z_{1,y}; J_y = j)$$
$$= \sum_{j=0}^{j=m} P(Z_{y+1} / J_{y+1} = m) P(J_{y+1} = m / J_y = j) P(Z_{1,y}; J_y = j)$$

-continued $$= P(Z_{y+1}/J_{y+1} = m) \sum_{j=0}^{j=m} P(J_{y+1} = m/J_y = j)\alpha_y(j)$$

Step 2=Computation of $\beta_y(m)$ $\beta_y(m)$ is initialized at 1 in y=n' for all the values of m between 1 and n. $\beta_y(m)$ is initialized as follows in y=n'−1, for all the values of m between 1 and n:

$$\beta_{n'-1}(m) = \sum_{j=m}^{j=n} P(Z_{n'}/J_{n'} = j)P(J_{n'} = j/J_{n'-1} = m)$$

then $\beta_y(m)$ is computed recursively for all the values of y between 1 and n'−2 and for all the values of m between 1 and n.

$$\beta_y(m) = \sum_{j=m}^{j=n} P(Z_{y+1}/J_{y+1} = j)P(J_{y+1} = j/J_y = m)\beta_{y+1}(j)$$

$$\beta_{y-1}(m) = P(Z_{y,n}/J_{y-1} = m)$$

$$= P(Z_y; Z_{y+1,n}/j_{y-1} = m)$$

$$= \sum_{j=m}^{j=n} P(Z_y; Z_{y+1,n}; J_y = j/J_{y-1} = m)$$

$$= \sum_{j=m}^{j=n} P(Z_{y+1,n}/Z_y; J_y = j/J_{y-1} = m)P(Z_y/J_y = j; J_{y-1} = m)P(J_y = j/J_{y-1} = m)$$

$$= \sum_{j=m}^{j=n} P(Z_{y+1,n}/J_y = j)P(Z_y/J_y = j)P(J_y = j/J_{y-1} = m)$$

$$= \sum_{j=m}^{j=n} \beta_y(m)P(Z_y/J_y = j)P(J_y = j/J_{y-1} = m)$$

Step 3=Final Computation

The method then computes the quantity $\lambda_y(m)$ for all the values y from 1 to n' and for all the values m from 1 to n $$\lambda_y(m) = \alpha_y(m)\beta_y(m)$$

In using the equations fw2 and fw2, we obtain the estimated value $J_y$ for all the values of y between 1 and n' which is expressed by the relationship:

$$\hat{J}_y = \underset{m=1,\ldots,n}{\mathrm{Argmax}}(\lambda_y(m))$$

i.e. the value taken for the value of $J_y$ is the value of m for which $\lambda_y(m)$ is the maximum:

Second Alternative Embodiment=Viterbi Method

The alternative implementation of the method, called the <<Viterbi method>>, corresponds to a search for the value of the index variable J which is globally the most probable value, given the observation of the received image, i.e.:

$$\hat{J} = \underset{K}{\mathrm{Argmax}}^{(r(J=K/Z;X))}$$

where $\hat{J}$ is the estimation sought for all the lines of the distorted image.

By applying Bayes' formula, we obtain, in an equivalent way:

$$\hat{J} = \underset{K}{\mathrm{Argmax}}^{(r(J=K/Z;X))} \qquad \text{(equation vit. 1)}$$

Let $V_y(m)$ denote the quantity (as in the description of the forward-backward method), the probabilities must be understood here as being conditional on X)

$$V_y(m) = \underset{J_{1,y-1}}{\mathrm{Max}}^{P(Z_{1,y};J_y=m;J_{1,y-1})}$$

and the associated random vector $\Lambda_y(m)$, with a probability $V_y(m)$:

$$\Lambda_{\psi(m)} = \underset{J_{1,y-1}}{\mathrm{ArgMax}}^{P(Z_{1,y};J_y=m;J_{1,y-1})}$$

The variable $P(Z_{1,y};J_y=m;J_{1,y-1})$ corresponds to the joint probability of observing the y first lines of the received image and of having the y first components of the index variable which assume a certain value (in particular, the line No. y of the received image corresponds to the line No. m of the original image).

$V_y(m)$ corresponds to the maximum value taken by this probability, when all the a priori values possible for $J_{1,y-1}$ are "tried out":

$\Lambda_y(m)$ then corresponds to the value of the y−1 first components of the index variable ($J_{1,y-1}$) which maximize this probability.

The equation vit. 1 can be expressed as a function of $\Lambda_y(m)$:

$$\operatorname*{Argmax}_K{}^{(P(J=K/Z;X))} = \operatorname*{Argmax}_K{}^{(P(J_{1;n'}=K_{1,n'};Z_{1,n'}/X))}$$

$$= \operatorname*{Argmax}_K{}^{\left(P\left(J_{1;n'}=K_{1,n'-1};J_{n'}=K_{n'};Z_{1,n'}/X\right)\right)}$$

$$= \operatorname*{Argmax}_m\left(\operatorname*{Argmax}_{K_{1,n'-1}}{}^{(P(J_{1;n'-1}=K_{1,n'-1};J_{n'}=m;Z_{1,n'}/X))}\right)$$

$$= \operatorname*{Argmax}_m{}^{(\Lambda_{n'}(m))}$$

$V_y(m)$ is initialized at y=1 for all the values m from 1 to n $$V_1(m) = P(Z_1/J_1=m)P(J_1=m)$$

Figure 9:
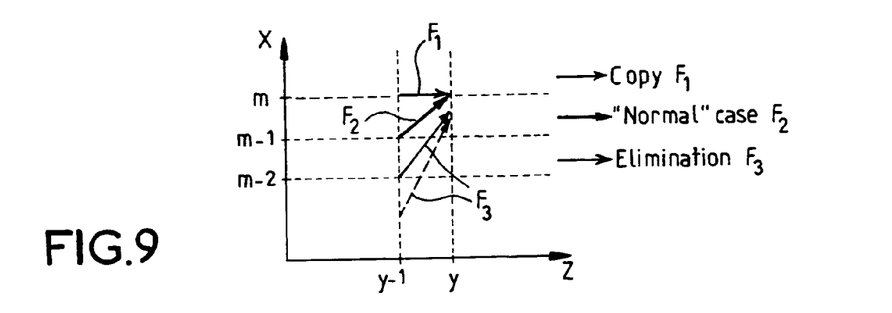

The method recursively computes for example $V_y(m)$ for all the values of y from 2 to n' and for all the values of m from 1 to n as follows (see FIG. 9):

In the figure, the arrow $F_1$ corresponds to a copy, the arrow $F_2$ to the "normal" case and the arrow $F_3$ to an elimination. We then get $\Lambda_y(m)$ as the associated vector.

The estimated value of J is then given in n by:

$$J_{n'} = \operatorname*{Argmax}_{m=1,\ldots,n}(V_{n'}(m))$$

that is, the value of m for which $V_n(m)$ is the maximum is taken as the value of $J_{n'}$.

Figure 10:
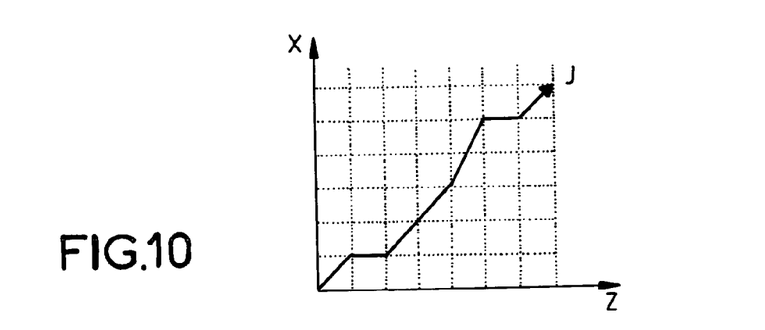
FIG. 10 shows another example of the Viterbi algorithm.

The other values of $J_y$ (y<n') are computed from $J_n$ in <<back-tracking>> as follows (FIG. 10):

$$J_y = \Lambda_y(J_{y+1})$$

Once the estimated values of the index variables corresponding to distortions have been introduced into the original image, the method uses them for example to obtain the rectified image designated by Z'.

Reverse of the Jitter Transformation

The method uses the estimated index variable J in order to reverse the jitter transformation in the image Z, to obtain the rectified image Z'.

Since the jitter transformation is not strictly reversible, since the certain lines or columns of the image are eliminated, hence definitively lost, there are several methods possible to reverse the jitter.

The following is one of the methods possible:

j is taken to be the y-axis value of the original image.

{a1 . . . am} is taken to be the set of all the components of the index variable J such that:

$$\forall i \in \{1 \ldots m\} J_{a_i} = j$$

We get the line No. j of Z' as follows:

If m≧1, the line No. j of Z' is obtained by taking the mean of the lines N°{$J_{a1}$ . . . $J_{am}$} of the received image Z.

If m=0 (the line No. j has been eliminated by the jitter), we get the line No. j of Z' by interpolation between the lines No. j−1 and No. j+1 of Z'.

In another approach, the message-carrying watermark reader module is adapted to the estimated value of the jitter. For example, if the line number j of the original image has been eliminated, the information on elimination is given to the detector so that it will not take account of it in the estimation of the watermark (flexible decoding).

Without departing from the framework of the invention, the steps described here above can be applied to estimating the local distortions introduced into audio data during their transmission or storage.

For example, the method and the device according to the invention can be applied in the following fields:

watermarking:
  application to the management of copyright: automatic control of distribution, fingerprinting, protection against unauthorized copying (especially in DVD),
  security applications: authentication of data sources, protection of confidential data,
  Metadata applications: watermarking enables the insertion of a persistent label into the work. This technique can be used in audience monitoring, the management of contributions in television studios or in post-production, the indexing and management of heterogeneous databases, the transmission of ancillary data (such as subtitles etc) compatible with all TV standards etc., Communications
  the invention can be used in digital communications, when it is sought to overcome phase jitter in order to reduce the error rate at reception, Image restoration
  the invention can be used to compensate for geometrical distortions in an image, in applications other than that of watermarking (the archival storage of images and video documents in analog format etc).

What is claimed is:

1. A method for the determining, in a device such as a watermark reader, of local geometrical variations that have occurred in data, the data comprising a reference pattern X, wherein the method comprises at least the following steps:
   modeling the local geometrical variations by means of an index variable J, said variable making it possible to place the samples of the distorted data in correspondence with those of the original data,
   estimating the local variations by using the reference pattern X included, a model of local distortion of the data and the distorted data.

2. A method according to claim 1 wherein it makes a global estimation of the local geometrical variations.

3. A method according to claim 1, wherein it makes a local estimation of the local geometrical vatiations.

4. A method according to claim 3, wherein the local distortion model is a Markov model.

5. A method according to claim 1, wherein the local distortion model is a Markov model.

6. A method according to claim 5, wherein the data are audio data or video type data or image data.

7. A method according to claim 1, wherein the data are audio data or video type data or image data.

8. A method according to claim 7, wherein the estimated data on local distortions are used to deduce a piece of information on the watermark and/or to correct the data.

9. A method according to claim 1, wherein the estimated data on local distortions are used to deduce a piece of information on the watermark and/or to correct the data.

10. A device for estimating the local geometrical variations that have occurred in data, said data comprising a reference pattern X, wherein the device comprises at least one microprocessor adapted to estimating the local geometrical variations by using the reference pattern included, a model of local distortion of the data and the distorted data, the local geometrical variations of the distorted data being modeled by means of an index variable J making it possible to place the samples of the distorted data in correspondence with those of the original data.

11. A device according to claim 10, wherein microprocessor is adapted to determining the local geometrical variations for data of the audio, video or image type.

12. A device according to claim 11, wherein the microprocessor is adapted to correcting the distortions induced in images received by a watermark reader and/or to producing a piece of information on the watermark.

13. A device according to claim 10, wherein the microprocessor is adapted to correcting the distortions induced in images received by a watermark reader and/or to producing a piece of information on the watermark.

* * * * *